United States Patent [19]

Deferme

[11] Patent Number: 5,738,190
[45] Date of Patent: Apr. 14, 1998

[54] FLEXING DISC-BLOW OFF ASSEMBLY FOR USE IN A SHOCK ABSORBER

[75] Inventor: Stefan Deferme, Heusden-Zolder, Belgium

[73] Assignee: Monroe Auto Equipment Company, Monroe, Mich.

[21] Appl. No.: 619,963

[22] Filed: Mar. 20, 1996

[51] Int. Cl.$^6$ ....................................................... F16F 9/49
[52] U.S. Cl. ........................... 188/280; 188/282; 188/317; 188/322.15; 188/322.16; 137/513.3; 137/854
[58] Field of Search ................... 188/282, 322.15, 188/322.16, 317, 327.17, 280; 137/513.3, 854

[56] References Cited

U.S. PATENT DOCUMENTS

| | | |
|---|---|---|
| Re. 28,329 | 2/1975 | Nicholls . |
| 2,695,079 | 11/1954 | Brundrett . |
| 2,717,058 | 9/1955 | Brundrett . |
| 3,199,638 | 8/1965 | Otomo . |
| 3,366,379 | 1/1968 | McNally . |
| 3,439,913 | 4/1969 | Kamman . |
| 3,874,487 | 4/1975 | Keijzer et al. . |
| 4,034,860 | 7/1977 | Leppich . |
| 4,460,074 | 7/1984 | Muller et al. ............... 188/322.15 X |
| 4,615,420 | 10/1986 | Mourray . |
| 4,660,689 | 4/1987 | Hayashi et al. . |
| 4,721,130 | 1/1988 | Hayashi . |
| 4,923,038 | 5/1990 | Lizell ............................. 188/322.15 X |
| 4,993,524 | 2/1991 | Grundei et al. ............... 188/322.15 X |
| 5,154,264 | 10/1992 | Poertzgen et al. . |
| 5,316,113 | 5/1994 | Yamaoka et al. ............ 188/322.15 X |

FOREIGN PATENT DOCUMENTS

| | | |
|---|---|---|
| 0336692A2 | 10/1989 | European Pat. Off. . |
| 3337798A1 | 5/1985 | Germany . |
| 2-66333 | 3/1990 | Japan . |
| 2283928 | 11/1990 | Japan . |

*Primary Examiner*—Lee W. Young
*Attorney, Agent, or Firm*—Harness, Dickey & Pierce

[57] ABSTRACT

A shock absorber utilizes a single flexing disc assembly includes a flexing disc which is capable of performing the flexing disc function normally required for allowing the passage of fluid between the two sides of a shock absorber while also providing the blow off function. The flexing disc is backed by a ridge formed on a spring seat. The ridge defines a ring that is concentric with the central long axis of the piston rod. Under normal rebounding conditions, the pressure of rebounding damping fluid builds to the point that the flexing disc is opened somewhat by flexing to allow normal bleedthrough. However, in the event that the rebound pressure builds to a higher, predetermined value, the valve flexes to an extreme degree against the ridge formed on the spring seat. In this manner, the ring acts as a fulcrum, and a quantity of damping fluid is allowed to pass thereby until normal rebound pressure values are reached.

21 Claims, 3 Drawing Sheets

FLEXING DISC-BLOW OFF ASSEMBLY FOR USE IN A SHOCK ABSORBER

BACKGROUND OF THE INVENTION

1. Field of the Invention

The present invention relates generally to shock absorbers having a specialized rebound valve. More particularly, the present invention relates to a shock absorber having a rebound valve defined by a flexing disc assembly that combines both the flexing disc function of normal valving with a blow-off function.

2. Description of the Relevant Art

Shock absorbers are used in connection with automobile suspension systems and other vehicle suspension systems to absorb unwanted vibrations which occur during locomotion. To absorb this unwanted vibration, shock absorbers are generally connected between the body and the suspension of the automobile.

The most common type of shock absorber in automobiles is the dashpot type in which a piston is located within the shock absorber and is connected to the vehicle body through a piston rod. Because the piston is available to limit the flow of damping fluid within the working chamber of the shock absorber when the shock absorber is compressed or extended, the shock absorber is able to produce a damping force which counteracts the vibration which would otherwise be transmitted from the suspension of the automobile to the body.

A conventional shock absorber comprises a pressure tube with a piston therein. A piston rod connected to the piston projects from one end of the pressure tube. Damping is controlled by orifices in the piston which regulate passage of fluid from one side of the piston to the other.

Vehicle shock absorbers are generally provided with bleed orifices which allow the restricted flow of damping fluid between the rebound side and the compression side. It is essentially this bleeding that provides the shock absorber with its damping characteristics.

Furthermore, shock absorbers include a blow off valve of some type. These valves are normally in a closed position. However, when pressure within the cylinder achieves a certain predetermined point, the blow off valve opens and alters considerably the restriction of damping fluid flow that would otherwise occur without the presence of the blow off valve.

Conventional shock absorbers utilize relatively complex structures to provide the bleed orifice and the blow off valve. For example, U.S. Pat. No. 4,721,130, issued on Jan. 26, 1988, to Hayashi for VALVE STRUCTURE OF HYDRAULIC BUFFER, discloses a valve structure used in a hydraulic buffer. A valve body is used for opening and closing ports in the piston. As the piston rod is extended, a free end of the valve body deflects about a first fulcrum to allow liquid to pass. When the piston is moving at a high speed and the force of liquid passing through the port exceeds the pre-load set to the spring, the spring seat is depressed so that more liquid flows through the port while deflecting the valve body about a second fulcrum.

Additionally, U.S. Pat. No. 2,717,058, issued to Brundrett on Sep. 6, 1955, for SHOCK ABSORBER CONTROL VALVE, discloses a shock absorber control valve for controlling restricted flow of hydraulic fluid between opposite ends of a shock absorber cylinder. A valve disk flexes upwardly against a rigid retainer plate as permitted by the angularity of the face portion of the plate. As the requirement for flow further increases, the valve member and the retainer are moved against the compression spring to change the fluid flow rate.

While providing advancements in the art of shock absorber valving, these inventions are relatively complex and fail to produce satisfactory results in terms of efficiency and cost. Accordingly, a shock absorber that combines the flexing disc function of a rebound valve with the blow off function is wanting.

SUMMARY OF THE INVENTION

Accordingly, it is a primary object of the present invention to provide a shock absorber that includes a flexing disc assembly which combines the flexing disc function of a rebound valve with the blow off function.

It is a further object of the present invention to provide such a shock absorber which performs the bleed functions at normal rates where the flexing and blow off functions are combined in a single flexing disc assembly.

It is still a further object of the present invention to provide such a shock absorber which allows flexing of the flexing disc at normal rates where the flexing and blow off functions are combined in a single flexing disc assembly.

Still another object of the present invention is to provide such a shock absorber in which blow off function occurs at normal rates where the flexing and blow off functions are combined in a single flexing disc assembly.

A further object of the present invention is to provide such a shock absorber in which restriction occurs at normal rates where flexing and blow off functions are combined in a single flexing disc assembly.

Still a further object of the present invention is to provide such a shock absorber which comprises a minimum number of parts.

Yet a further object of the present invention is to provide such a shock absorber which is reliable and may be produced at a low cost.

The shock absorber of the present invention utilizes a single disc which is capable of performing the flexing disc function normally required for allowing the passage of fluid between the two sides of a shock absorber while also providing the blow off function normally provided in a shock absorber by a separate valve. The flexing disc is backed by a ridge formed on a spring seat. The ridge defines both a groove and a ring that is concentric with the central long axis of the piston rod. The groove is formed adjacent the piston rod. The opposite side of the flexing disc rests against a ridge formed on the compression side face of the piston. The piston has an array of fluid-passing apertures which allow the selective bypassage of fluid therethrough. The flexing disc includes a passageway defined therein to allow an amount of damping fluid to flow between the apertures formed in the piston and the groove of the spring seat.

Under normal rebounding conditions, the pressure of rebounding damping fluid builds to the point that the flexing disc flexes to allow normal bleedthrough. However, in the event that the rebound pressure builds to a higher, predetermined value, the combined pressure of the damping fluid built up beneath the disc and in the groove of the spring seat forces the spring seat to move axially along the guide, thus allowing a blow off of fluid from the rebound side of the piston until normal rebound pressure values are reached.

Thus the present invention provides a cost-effective and efficient mechanism for providing both flexing of a flexing disc while embodying the same element with the blow off function.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which.

DETAILED DESCRIPTION OF THE PREFERRED EMBODIMENT

The drawings disclose the preferred embodiment of the present invention. While the configurations according to the illustrated embodiment are preferred, it is envisioned that alternate configurations of the present invention may be adopted without deviating from the invention as portrayed. The preferred embodiment is discussed hereafter.

Figure 1:
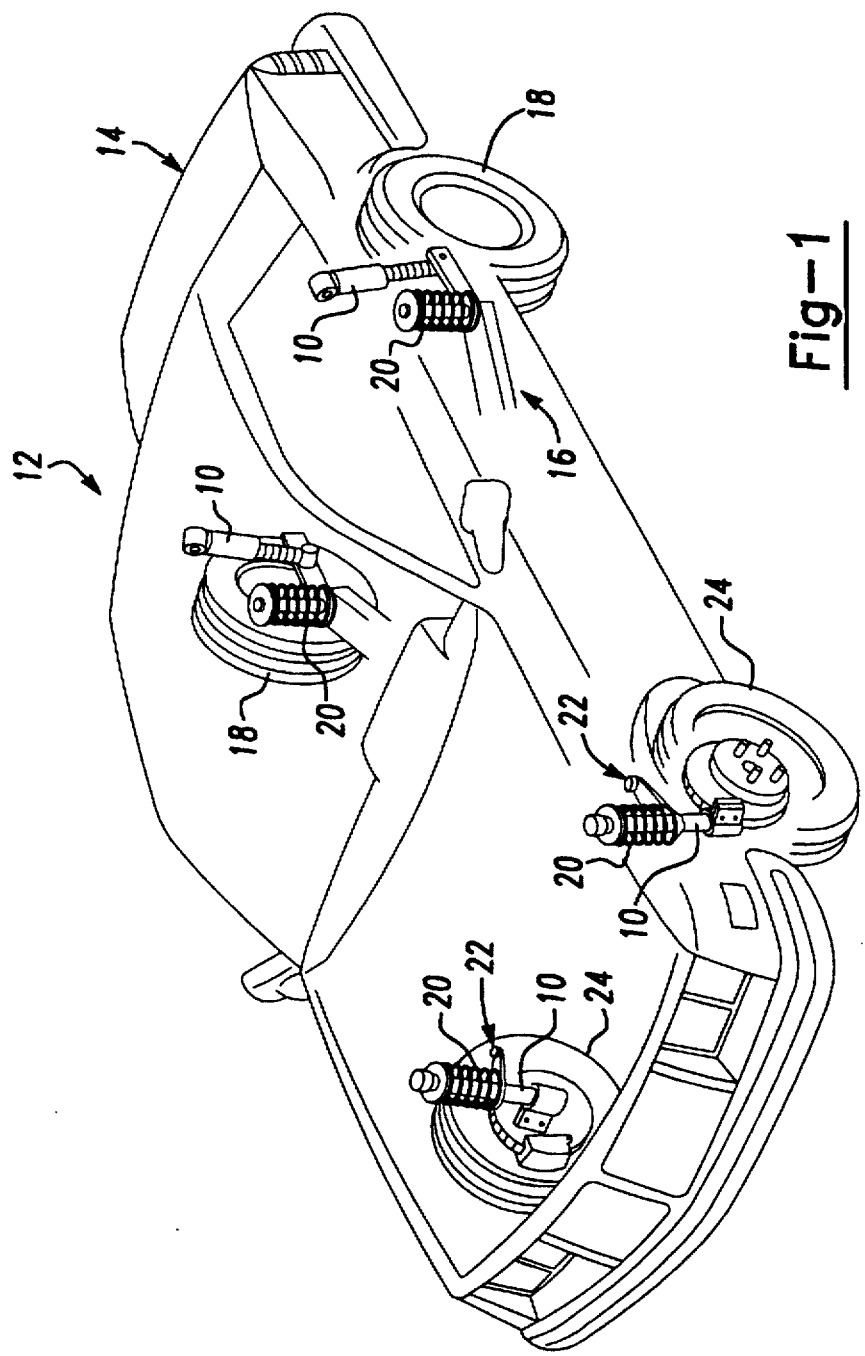
FIG. 1 is a schematic representation of shock absorbers, according to the present invention, in operative association with a typical automobile.

Referring to FIG. 1, a plurality of four shock absorbers 10 according to a preferred embodiment of the present invention are shown. The shock absorbers 10 are depicted in operative association with a diagrammatic representation of a conventional automobile 12 having a vehicle body 14. The automobile 12 includes a rear suspension system 16 having a transversely extending rear axle assembly (not shown) adapted to operatively support the vehicle's rear wheels 18. The rear axle assembly is operatively connected to the automobile 12 by a pair of shock absorbers 10 and a pair of helical coil springs 20. Similarly, the automobile 12 has a front suspension system 22 including a transversely extending front axle assembly (not shown) to operatively support the vehicle's front wheels 24. The front axle assembly is operatively connected to the vehicle body 14 by means of a second pair of shock absorbers 10 and by another pair of helical coil springs 20. The shock absorbers 10 serve to damp the relative movement of the unsprung portion (i.e., the front and rear suspension systems 22 and 16) and the sprung portion (i.e., the body 14) of the automobile 12. While the automobile 12 has been depicted as a passenger car, the shock absorber 10 may be used with other types of vehicles or in other types of vibration damping applications. Further, the term "shock absorber" as used herein will refer to shock absorbers in the general sense of the phrase and will include MacPherson struts.

Figure 2:
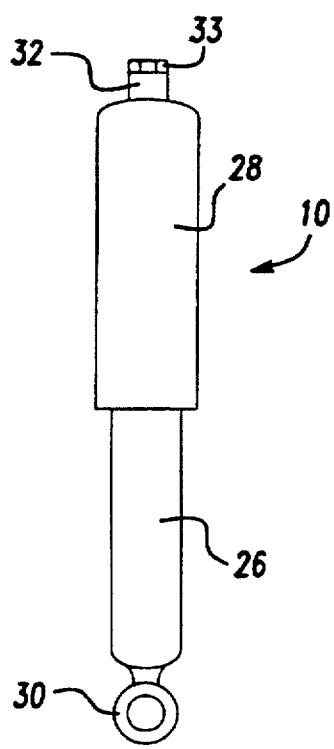
FIG. 2 is a side view of a shock absorber according to the present invention.

With particular reference to FIG. 2, the shock absorber 10 according to the present invention is shown. The shock absorber 10 comprises a first tubular end 26 and a second tubular end 28, the ends 26 and 28 generally defining tubular assemblies. A suitable end fitting 30 is secured to the lower end of the first end 26 for operatively securing the shock absorber 10 to the axle assembly of the automobile 12 in a conventional manner. A piston rod 32 includes a threaded end 33 that extends through the second end 28 and is attached to the vehicle body 14 also in a conventional manner.

Figure 3:
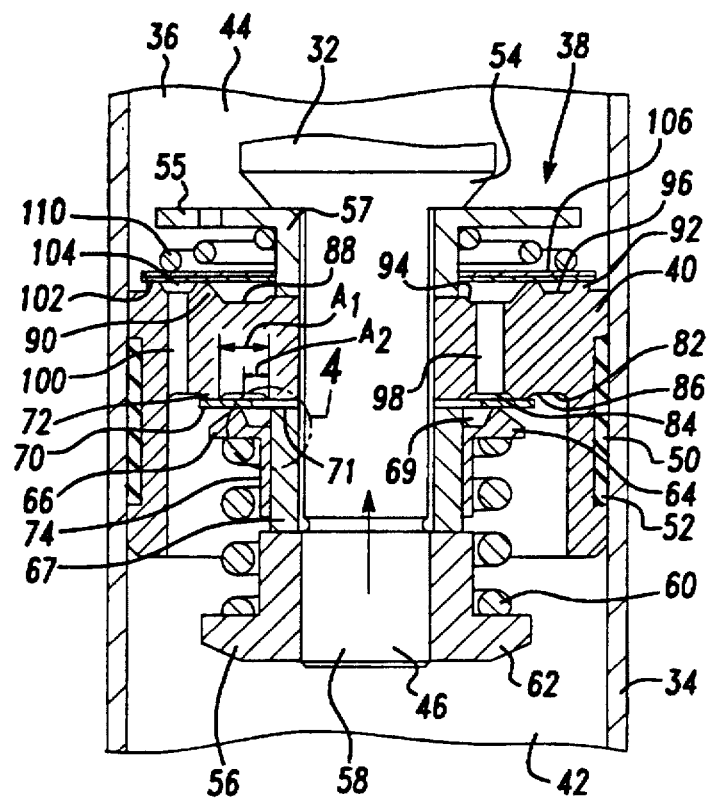
FIG. 3 is a sectional view of the piston and the connecting piston rod illustrated within a portion of the pressure tube housing.
Figure 4:
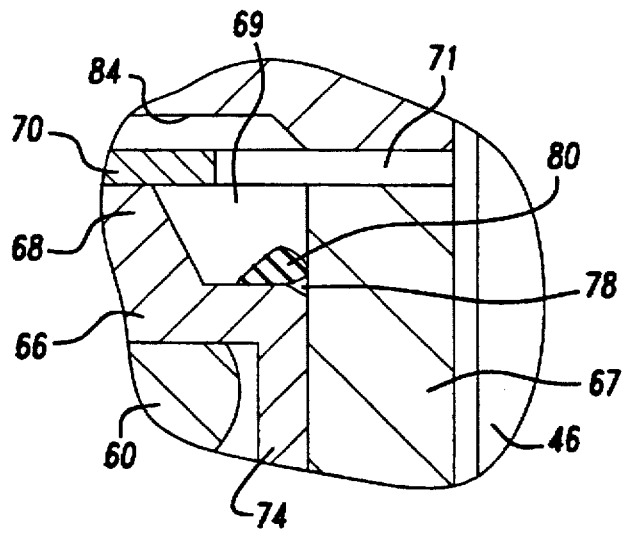
FIG. 4 is a detailed view of the juncture between the piston post, the spring seat, and a seal vulcanized on the spring seat.

With respect to FIGS. 3 and 4, a sectional view of the piston within the piston housing of the shock absorber 10 is shown. The shock absorber 10 comprises an elongated pressure tube cylinder 34 defining a damping fluid containing working chamber 36. The elongated pressure tube cylinder 34 is generally housed within the second tubular end 28 in a known manner.

A reciprocatingly movable piston assembly, generally illustrated as 38, includes a reciprocal piston 40. The piston 40 divides the working chamber 36 into a compression side 42 and a rebound side 44. The reciprocal piston 40 is secured to one end of an axially extending piston post 46 which is in turn secured to the axially extending piston rod 32 which passes through the tubular second end 28.

The piston 40 includes a peripheral channel 50 defined on its annular exterior. A seal 52 is fitted within the channel 50 to form a fluid-tight seal between the inner peripheral wall of the cylinder 34 and the piston 40. The seal 52 permits reciprocal movement of the piston 40 with respect to the cylinder 34 without generating undue frictional forces.

Movement of the piston 40 in a first direction is limited by a radially extending step portion 54 of the piston post 46 against which is positioned a radial support plate 55. The support plate 55 includes an axial collar 57 which is positioned between the step portion 54 and the piston 40.

Movement of the piston 40 in a second direction is limited by a nut 56 or similar type of fastening element which is matably (i.e., threadably or force-fittably) received upon the upper end 58 of the piston post 46. A helical coil rebound spring 60 is arranged concentrically of the nut 56 and is supported at one end thereof by a radially outwardly extending flange 62 on the lower end (relative to the illustration) of the nut 56. The opposite end of the rebound spring 60 bears against a shoulder 64 formed on a spring seat 66. The spring seat 66 is positioned on a tubular guide 67 which is fitted on the piston post 46 between the nut 56 and the step portion 54. The spring seat 66 is axially movable on the guide 67.

On the piston-facing side of the shoulder 64 of the spring seat 66 is formed a ridge 68. Between the ridge 68 and the guide 67 is formed a ringed groove 69. The rebound spring 60 acts biasingly against a flexing valve disc 70 through the ridge 68. The piston 40 is accordingly locked between the support plate 55 on its rebound side and the combination of the flexing disc 70 and the guide 67 on its compression side, all of which are urged against the radially extending step portion 54 of the piston post 46 by the nut 56.

The flexing disc 70 includes a fluid-passing aperture 71 formed therein. The opposite side of the flexing valve disc 70 normally rests against a concentric ridge 72 formed in a cup-shaped concavity defined in the compression side of the piston 40. The ridge 68 acts as a fulcrum over which the flexing valve disc deforms to allow passage of a quantity of damping fluid during normal operations and under normal pressure as will be described below. Accordingly, the biasing force produced by the action of the rebound spring 60 resists movement of the flexing disc 70 away from its normal position against the concentric ridge 72.

The spring seat 66 includes an axial collar 74 that extends partially along the tubular guide 67 to provide the seat 66 with radial support.

Between the ridge 68 of the spring seat 66 and the guide 67 is formed the ringed groove 69 that terminates in the chamfered edge 78, as best illustrated in FIG. 4. The chamfered edge 78 facilitates assembly of the spring seat 66 on the guide 67. An O-shaped seal 80 is provided at the shoulder defined between the ringed groove 69 of the seat 66 and the guide 67. The seal 80 is preferably composed of a rubber or other polymerized material that is vulcanized onto the spring seat 66.

The concentric ridge 72 is formed on the compression side 82 of the piston 40 and divides the compression side 82 into an inner ringed groove 84 and an outer ringed groove 86. On the rebound side 88 of the piston 40 are formed a pair of concentric ridges that include an inner concentric ridge 90 and an outer concentric ridge 92.

Between the inner concentric ridge 90 and the collar 57 is formed an inner ringed groove 94 and between the outer concentric ridge 92 and the inner concentric ridge 90 is formed an outer ringed groove 96. A first series of axial fluid-passing apertures 98 are defined through the piston 40 between the groove 84 and the inner ringed groove 94. Similarly, a second series of axial fluid-passing apertures 100 are formed between the ringed groove 86 and the outer ringed groove 96.

An orifice disc 102 rests against the inner and outer concentric ridges 90 and 92, respectively. The disc 102 has formed therein a plurality of fluid passageways 104. Abutting the orifice disc 102 is an intake valve 106 which has no fluid passageways formed therein. An intake spring 110 is biasingly fitted between the radial support plate 55 and the intake valve 106. The spring 110 presses against the intake valve 106 and the orifice disc 102.

On compression, the piston 40 is moved within the cylinder 34 and compresses fluid in the compression side 42 therein. This action forces the fluid to flow through the apertures 100 and the orifice disc 102 and against the intake valve 106. When the fluid pressure reaches a certain level, the pressure overcomes the force of the spring 110, and the intake valve 106 opens, allowing fluid to pass.

On rebound, the piston 40 is moved within the cylinder 34 in the opposite direction and compresses fluid in the rebound side 40 therein. This action forces the fluid to flow through the apertures 98 (in a direction opposite that of damping fluid moving during compression) and against the flexing disc 70. When the fluid pressure reaches a certain level, the pressure causes the flexing disc 70 to flex, thus allowing the fluid to pass. In the event that the pressure on the rebound side builds to a predetermined level wherein the pressure of the damping fluid in the groove 69 and the pressure of the fluid from the apertures 98 overcomes the biasing force of the spring 60, the spring seat 66 is moved axially along the guide 67, thus allowing the bypassage of a significant amount of damping fluid as required to prevent damage to the shock absorber or to the vehicle.

Figure 5:
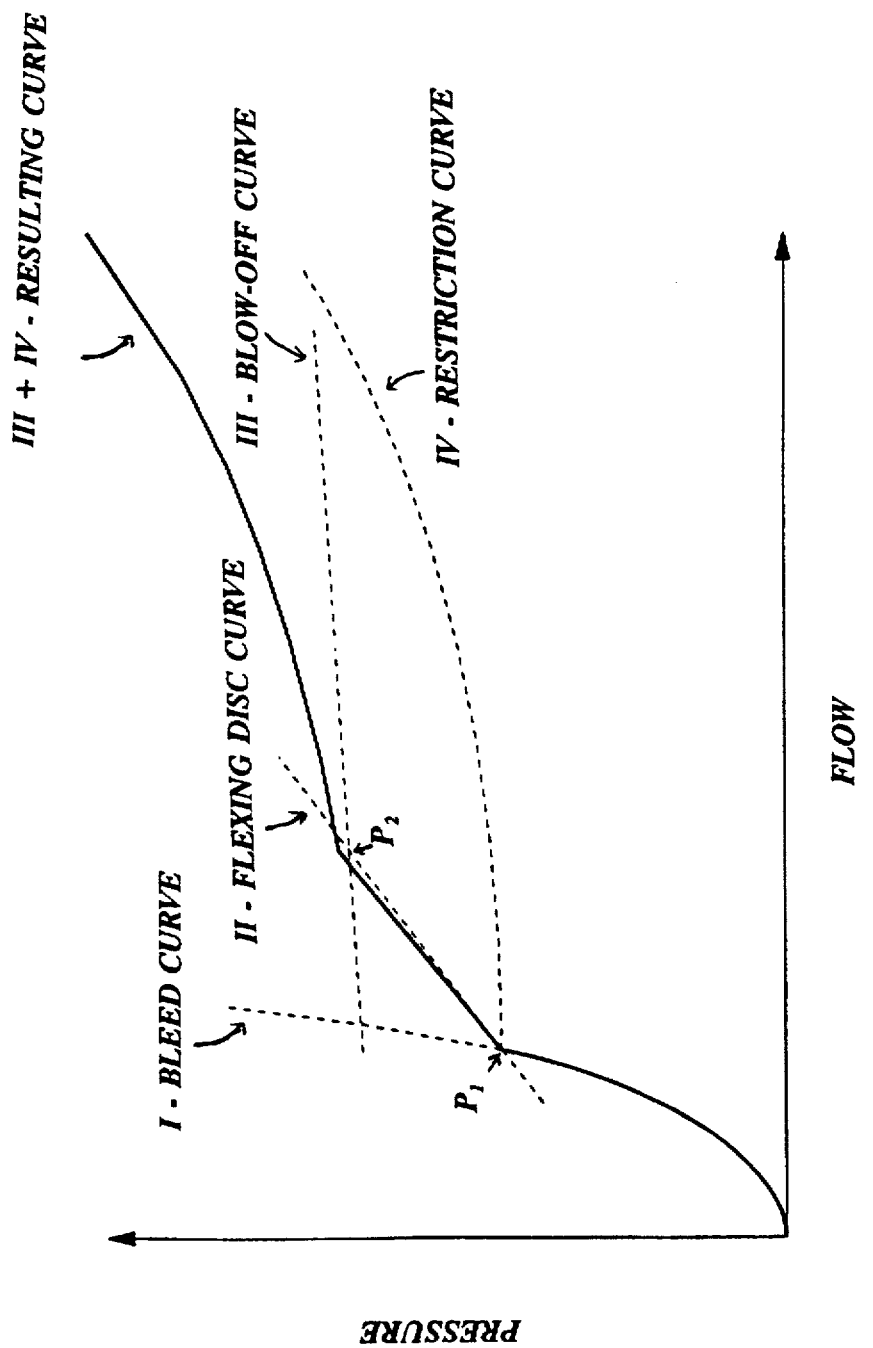
FIG. 5 is a graph illustrating the various curves produced by the shock absorber of the present invention.

FIG. 5 is a graph illustrating the control parameters of the present invention with PRESSURE being read along the Y-axis and FLOW being read along the X-axis. The bleed (or restruction curve, illustrated as I, demonstrates a typical bleed (or restriction) curve at low rod velocities. The results of the improved design of the present invention with respect to the characteristics of the flexing disc are shown as illustrated as II. At pressure $P_1$, force $F_1$ works on the flexing disc 70 at area $A_1$ of FIG. 3, or that area formed generally between the diameter of the guide 67 and the ridge 72, thus causing the disc 70 to bend. Here, $P_1=F_1/A_1$. This shows a typical flexing disc curve.

Curve III is the blow-off curve as demonstrated by the present invention. At pressure $P_2$, the spring seat area (area $A_2$), the area generally formed between the diameter of the guide 67 and the ridge 68 of the spring seat 66, will be blown off. Here, $P_2=F_2/A_2$ and $F_2$=Fspring. Accordingly, $P_2>P_1$ because $A_2<<A_1$. This shows a typical blow off curve.

Curve IV is the restriction curve. This is a typical restriction curve. The combination of the blow-off curve (Curve III) and the restriction curve (Curve IV) define a resulting curve (Curves III and IV).

As illustrated, the graph demonstrates how the present invention combines the flexing disc function with the blow off function.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A shock absorber comprising:
   a pressure tube defining an axis, said pressure tube forming a working chamber;
   a piston slidably disposed within said working chamber and dividing said working chamber into an upper portion and a lower portion, said piston defining an aperture allowing flow of hydraulic fluid between said upper and lower portions of said working chamber;
   an elongated piston rod having first and second ends, said first end being attached to said piston, said second end of said elongated piston rod extending along the axis of said pressure tube through said upper portion of said working chamber and out one end of said pressure tube;
   a spring seat fitted to and axially movable with respect to said elongated piston rod, said spring seat defining a ridge;
   a flexing rebound valve disc positioned between said ridge of said spring seat and said piston, said disc prohibiting fluid flow through said aperture; and
   a fluid passage defined between said disc and said piston, said fluid passage being in communication with said aperture and being opened by said disc flexing with respect to said ridge on said spring seat.

2. The shock absorber of claim 1 wherein, said shock absorber further comprises a tubular collar positioned on said piston rod adjacent said piston, said spring seat being movably disposed on said tubular collar.

3. The shock absorber of claim 1 wherein, said ridge of said spring seat is concentric with said piston rod.

4. The shock absorber of claim 2 wherein, said shock absorber further comprises an elastomeric seal disposed between said spring seat and said tubular collar.

5. The shock absorber of claim 4, wherein said elastomeric seal is formed on said spring seat.

6. The shock absorber of claim 1 wherein, said piston includes a first side, said first side having a ridge formed thereon, said flexing disc being positioned against said ridge of said piston.

7. The shock absorber of claim 6 wherein, said ridge of said piston is concentric with respect to said piston rod.

8. The shock absorber of claim 6, wherein said ridge of said spring seat has a first diameter and said ridge of said piston has a second diameter, said first diameter being less than said second diameter.

9. The shock absorber of claim 1 wherein, said shock absorber further comprises biasing means positioned between said spring seat and said piston rod for biasing said spring seat and said valve disc towards said piston.

10. A shock absorber comprising:
    a pressure tube forming a working chamber;

a piston slidably disposed within said working chamber and dividing said working chamber into an upper portion and a lower portion, said piston allowing restricted flow of hydraulic fluid between said upper and lower portions of said working chamber;

a rebound valve assembly mated with said piston, said rebound valve assembly including a flexing disc and a spring seat, said spring seat defining a ridge, said flexing disc being disposed between said piston and said ridge defined by said spring seat; and a fluid passage defined between said disc and said piston, said fluid passage being opened by said disc flexing with respect to said ridge on said spring seat.

11. The shock absorber of claim 10 wherein, said shock absorber further comprises a piston rod connected to said piston and wherein said ridge of said spring seat is concentric with said piston rod.

12. The shock absorber of claim 11 wherein, said shock absorber further comprises a guide positioned between said spring seat and said piston rod, said spring seat being axially movable on said guide.

13. The shock absorber of claim 12 wherein, said ridge of said spring seat defines a groove between said ridge of said spring seat and said guide.

14. The shock absorber of claim 13, wherein said flexing disc includes a fluid-passing aperture formed therein.

15. The shock absorber of claim 12 wherein, said shock absorber further comprises an elastomeric seal disposed between said spring seat and said guide.

16. The shock absorber of claim 15, wherein said elastomeric seal is formed on said spring seat.

17. A valve assembly for use in a shock absorber, said shock absorber having a reciprocating piston defining a flow aperture extending through said piston and a piston rod connected to said piston, said valve assembly comprising:

a spring seat defining a ridge, said spring seat being fitted to and movable with respect to said piston rod;

a flexing disc positioned between said ridge of said spring seat and said piston, said disc prohibiting fluid flow through said flow aperture; and a fluid passage defined between said disc and said piston, said fluid passage being in fluid communication with said flow aperture and being opened by said disc flexing with respect to said ridge on said spring seat.

18. The valve assembly of claim 17 wherein, said ridge of said spring seat is positioned concentric with said piston rod.

19. The valve assembly of claim 18, further comprising a guide disposed between said spring seat and the piston rod, said spring seat being axially movable on said guide.

20. The valve assembly of claim 19 wherein, said valve assembly further comprises an elastomeric seal disposed between said spring seat and said guide.

21. The valve assembly of claim 20 wherein, said elastomeric seal is formed on said spring seat.

* * * * *